(12) United States Patent
Kondasani

(10) Patent No.: US 8,666,996 B2
(45) Date of Patent: Mar. 4, 2014

(54) METHODS AND SYSTEMS FOR DETECTING BROKEN LINKS WITHIN A FILE

(75) Inventor: Thakur B. Kondasani, St. Peters, MO (US)

(73) Assignee: MasterCard International Incorporated, Purchase, NY (US)

( * ) Notice: Subject to any disclaimer, the term of this patent is extended or adjusted under 35 U.S.C. 154(b) by 754 days.

(21) Appl. No.: 12/646,452

(22) Filed: Dec. 23, 2009

(65) Prior Publication Data

US 2011/0153631 A1  Jun. 23, 2011

(51) Int. Cl.
*G06F 17/30* (2006.01)

(52) U.S. Cl.
USPC .......................................... 707/758

(58) Field of Classification Search
USPC .......................................... 707/758
See application file for complete search history.

(56) References Cited

U.S. PATENT DOCUMENTS

| | | | |
|---|---|---|---|
| 5,694,603 | A | 12/1997 | Reiffin |
| 5,694,604 | A | 12/1997 | Reiffin |
| 6,253,204 | B1 | 6/2001 | Glass et al. |
| 6,449,739 | B1 | 9/2002 | Landan |
| 7,139,747 | B1 | 11/2006 | Najork |
| 7,290,131 | B2 | 10/2007 | Beynon et al. |
| 7,290,205 | B2 * | 10/2007 | Moncsko et al. ............. 715/208 |
| 7,720,823 | B1 * | 5/2010 | Rehfeld ......................... 707/691 |
| 7,822,927 | B1 * | 10/2010 | Scheer .......................... 711/133 |
| 2004/0205076 | A1 * | 10/2004 | Huang et al. .................. 707/100 |
| 2005/0021997 | A1 * | 1/2005 | Beynon et al. ................ 713/200 |
| 2005/0071766 | A1 * | 3/2005 | Brill et al. .................... 715/738 |
| 2006/0036582 | A1 * | 2/2006 | Sondergaard et al. ............ 707/3 |
| 2007/0100865 | A1 * | 5/2007 | King et al. .................... 707/102 |
| 2007/0162419 | A1 * | 7/2007 | Ahn et al. ........................ 707/1 |
| 2007/0239729 | A1 * | 10/2007 | Giallanza ....................... 707/10 |

OTHER PUBLICATIONS http://www.relsoftware.com/wlv; "Web Link Validator: The Broken Links Doctor"; Copyright 2001-2009 REL Software; 2 pages.
http://www.wrensoft.com/zoom/; Zoom Website Search Engine—Add search to a website, intranet or CD; Copyright 2008 Wrensoft; 3 pages.
http://www.netmechanic.com/link_check.htm; Link checker and HTML code checking by NetMechanic; Copyright 1996-2007 Keynote NetMechanic; 3 pages.
http://www.intranetjournal.com/reviews/idm0997-linkbot.shtml; Rob Bilson "Linkbot Pro 3.0"; Tetranet Software, Inc.; originally appeared in IDM, vol. 2, No. 19, Sep. 11, 1997; 4 pages.
http://www.ixacta.com/products/ixsite/; "Ixsite Web Analyzer: Website Analysis Software"; Copyright 2008 Ixacta, Inc. 1 page.
http://www.ixacta.com/products/ixsite/details/linkchecker.html; "Link Checker: Find Broken Links"; Copyright 2008 Ixacta, Inc. 2 pages.

* cited by examiner

*Primary Examiner* — Robert Beausoliel, Jr.
*Assistant Examiner* — Noosha Arjomandi
(74) *Attorney, Agent, or Firm* — Armstrong Teasdale LLP

(57) ABSTRACT

A method for detecting broken links using a computer coupled to a database is described. A plurality of links including valid links and broken links are embedded within data files stored in the database. The method includes receiving, at the computer, a selection of at least one directory that includes a plurality of data files to be analyzed. The method also includes analyzing all links embedded within the data files stored in the at least one selected directory to detect broken links. The method also includes determining that no other links are embedded within the data files stored in the at least one selected directory and generating a broken link report that includes broken link data for each broken link detected.

23 Claims, 6 Drawing Sheets

METHODS AND SYSTEMS FOR DETECTING BROKEN LINKS WITHIN A FILE

BACKGROUND OF THE INVENTION

The field of the present disclosure relates generally to detecting broken links between source pages and target pages, and more particularly, to a system configured to analyze all links included within source pages located in a selected directory.

Many corporations create and maintain a network of client systems and server systems to facilitate transferring electronic files from the server systems to the client systems. Typically, a user accesses electronic files stored by the server systems using a network-enabled client system, for example, a computer. The content stored by the server systems may include electronic documents, electronic files, and/or other forms of electronic data. A hierarchical system of directories is often used to organize the content. The content may also be organized and accessible to users by interlinking the content, for example, using a web site. The web site is a collection of web pages that can be accessed and viewed using a web browser. Typically, client systems include web browsers. When accessed by the web browser, the web pages display information for use by users who are allowed access to the network and facilitate interaction between the client system and the server system.

For example, many corporations create and maintain an internal corporate web site for use by users, for example, employees, contractors, and vendors. Each department of a multi-department corporation may create and store electronic documents on the server system. Those documents may be organized and made accessible to the users by adding one or more web pages to the corporate web site that include links to the documents. Some examples of corporate web sites are known to include thousands of web pages and thousands of documents, interconnected by tens of thousands of links. Typically, each web page and each electronic document exists as a separate entity, which is each identified by a unique address on the network called a Uniform Resource Locator (URL). Embedded within a first web page may be a link to a second web page or to a document. In this example, the first web page is referred to as a source file and the second web page is referred to as a target file. More specifically, the link embedded in the source file includes a URL which points to the target file. If the link is functioning properly, when the user selects the link while viewing the source file using the client system, the user is then provided with the target file via the client system.

The link will not function properly if the target file has been removed from the server system or if the URL of the target file has been changed. Typically, if a non-functioning link is selected, the user will receive an error message at the client system. A link embedded within a source file that does not connect the source file to the target file is referred to herein as a "broken link." Broken links cause frustration and workplace inefficiency. When a target file has been removed, replaced, altered, or moved without updating the source file links that reference the target file, the value of the target file is reduced due to decreased access to the target file. Locating the broken links within a web site allows the broken links to be repaired, either by editing the source files or by changing the URL of the target files to match the source file links.

Software is currently available for checking the validity of hypertext links embedded within web pages. Typically, a spider technology is used to "crawl" an intranet or Internet web. Spider software is initialized by a user to begin on a certain web page (i.e., a first active web page). The software parses the first active web page for a link. Once the software identifies the link, the software selects the link, closing the first active web page and opening the target web page, which becomes a second active web page. The software begins to parse the second active web page to identify a link. Once a link is found in the second active web page, the software selects the link and the target web page associated with the link becomes a third active web page. The software operates under an assumption that the web pages being analyzed are sufficiently interconnected to ensure the software parses all of the web pages. For this reason, crawling between web pages upon identification of a link does not ensure that all web pages are parsed, and also does not ensure that all links within each web page are analyzed.

BRIEF DESCRIPTION OF THE INVENTION

In one aspect, a method for detecting broken links using a computer coupled to a database is provided. A plurality of links including valid links and broken links are embedded within files stored in the database. The method includes receiving, at the computer, a selection of at least one directory that includes a plurality of data files to be analyzed. The method also includes analyzing all links embedded within the data files stored in the at least one selected directory to detect broken links. The method also includes determining that no other links are embedded within the data files stored in the at least one selected directory and generating a broken link report that includes broken link data for each broken link detected.

In another aspect, a computer program embodied on a computer readable medium for detecting broken links embedded within a plurality of data files stored in at least one selected directory is provided. The program includes at least one code segment executable by a computer to instruct the computer to receive a selection, from a user, of at least one directory that includes a plurality of data files to be processed. The program also includes at least one code segment executable by a computer to process the plurality of data files to identify links embedded within the data files, process the links to detect broken links, and determine that no other links are embedded within the plurality of data files. The program also includes at least one code segment executable by a computer to generate a broken link report that includes broken link data for each broken link detected.

In another aspect, a computer for detecting broken links embedded within data files stored in a database is provided. The computer is configured to receive a selection of at least one directory stored in the database wherein the at least one directory includes a plurality of data files to be analyzed, analyze all links embedded within the data files stored in the at least one selected directory to detect broken links, determine that no other links are embedded within the data files stored in the at least one selected directory, and generate a broken link report that includes broken link data for each broken link detected.

DETAILED DESCRIPTION OF THE INVENTION

Set forth below is a description of methods and systems for detecting broken links. The methods and systems are sometimes described as being practiced utilizing an intranet or the Internet. An intranet and the Internet, however, are examples of communication networks, and the methods and systems described herein can be practiced in connection with many other local area and wide area networks. Therefore, the methods and systems are not limited to a practice of using an intranet and/or the Internet, and can be practiced using many other networks.

As used herein the term "link" or "links" is defined to include a computer instruction that connects a first data file or a portion of the first data file to either another portion of the first data file or a second data file. In other words, a link is a navigation tool that connects portions of data files or separate data files together. A link can also be described as a pointer that points to another file or another computer record.

Technical effects of the methods, systems, and computer-readable media described herein include at least one of: (a) receiving a selection, at a computer, of at least one directory to be analyzed, the at least one selected directory including a plurality of data files, the plurality of data files comprising at least one of a directory and a source file, the source file including at least one link embedded therein; (b) analyzing all links embedded within the source file stored in the at least one selected directory to detect broken links; and (c) generating a broken link report that includes broken link data for each broken link detected.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
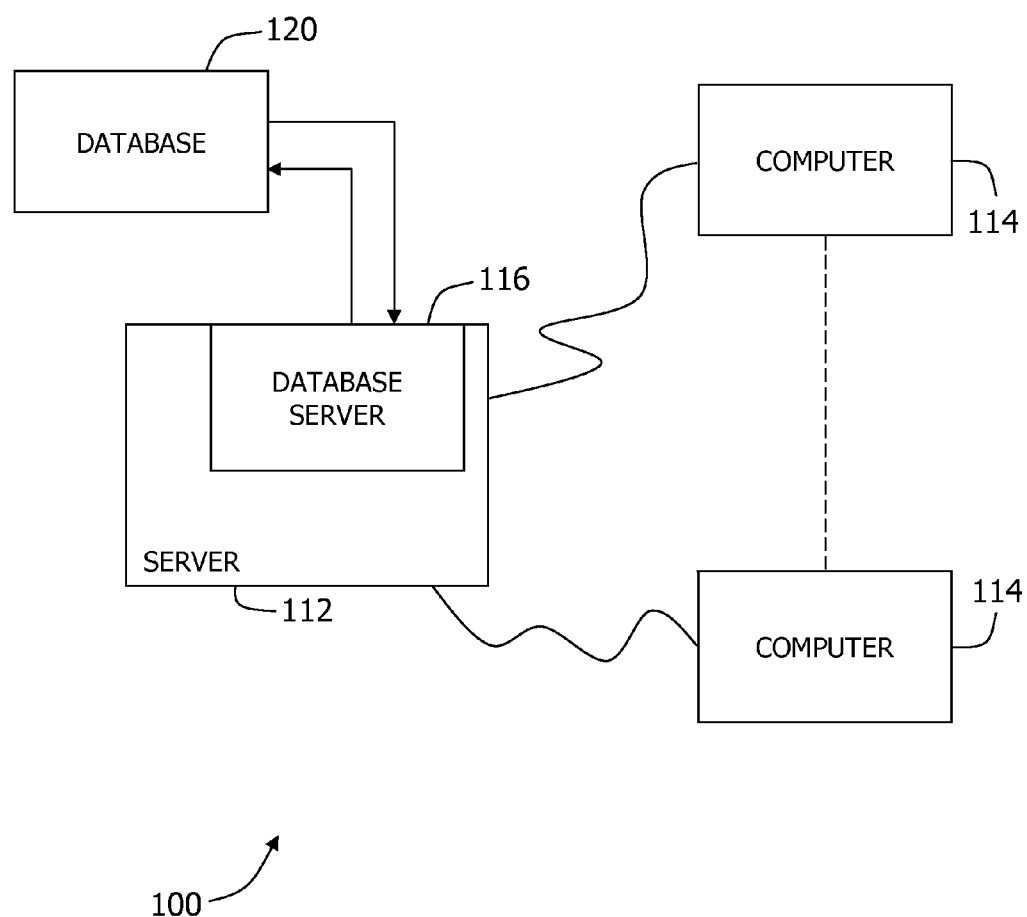
FIG. 1 is a simplified block diagram of an exemplary computer system for analyzing links included within data files located in a selected directory in accordance with one embodiment of the present invention.

FIG. 1 is a simplified block diagram of an exemplary system 100 in accordance with one embodiment of the present invention. System 100 is a client/server system that may be utilized for storage and delivery of files. More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 may be interconnected to the Internet through a variety of interfaces including a network, such as a local area network (LAN) or a wide area network (WAN), dial-in-connections, cable modems and special high-speed ISDN lines. Client systems 114 could be any device capable of interconnecting to the Internet including a personal computer (PC), a web-based phone, personal digital assistant (PDA), or other web-based connectable equipment.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store electronic files. Electronic files may include electronic documents, web pages, image files, sound files, video files, and/or electronic data of any format suitable for storage in database 120 and delivery using system 100. As described above, a corporation's web site typically includes a plurality of individual web pages that are linked, for example, by hyperlinks. The hyperlinks facilitate navigation between the web pages. Each individual web page is identified by a unique address called a Uniform Resource Locator (URL). In some embodiments, the web pages are stored by a single server system, for example, server system 112. In other embodiments, the web pages may be stored by multiple server systems, all of which are accessible by client systems 114 via, for example, the Internet. The individual web pages may also include links to electronic files and/or electronic documents, which are also identified by a unique address. Web pages, electronic documents, and/or electronic data of any format that is accessible using links will be referred to herein as electronic files. As described herein, a source electronic file is a file that includes a hyperlink that points to a target electronic file. If an address of the target file changes, or the target file is deleted, the hyperlink within the source file that points to the target file is referred to as a "broken link." Should a user viewing the source file select a broken link, server system 112 will return an error message to the user informing the user that the target file no longer exists or has been moved.

Figure 2:
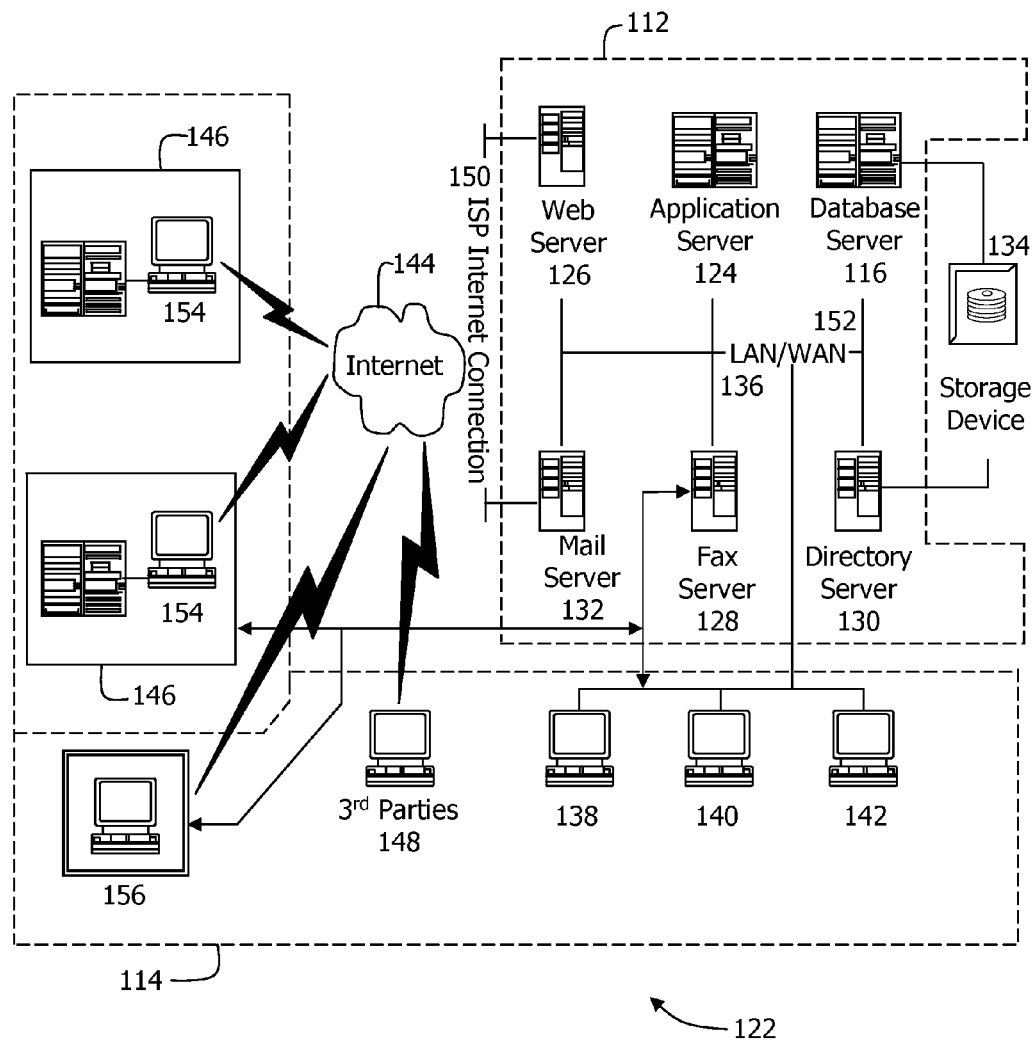
FIG. 2 is an expanded block diagram of an exemplary embodiment of a server architecture of a computer system for analyzing links included within data files located in a selected directory in accordance with one embodiment of the present invention.

FIG. 2 is an expanded block diagram of an exemplary embodiment of a server architecture of a system 122 for detecting broken links More specifically, in the exemplary embodiment, system 122 analyzes all links included within source files located in a selected directory. Components in system 122, identical to components of system 100 (shown in FIG. 1), are identified in FIG. 2 using the same reference numerals as used in FIG. 1. System 122 includes server system 112 and client systems 114. Server system 112 further includes database server 116, an application server 124, a web server 126, a fax server 128, a directory server 130, and a mail server 132. A storage device 134, for example, a disk storage unit, is coupled to database server 116 and directory server 130. Storage device 134 may be configured to store a database, for example, database 120 (shown in FIG. 1). Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136, for example, using an Internet 144 link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 146 and other third parties 148, using an ISP Internet connection 150. The communication in the exemplary embodiment is illustrated as being performed using the Internet 144, however, any other wide area network (WAN) type communication can be utilized in other embodiments, i.e., the systems and processes are not limited to being practiced using Internet 144. In addition, and rather than WAN 152, local area network 136 could be used in place of WAN 152.

In the exemplary embodiment, any authorized individual having a workstation 154 can access system 122. At least one of the client systems includes a manager workstation 156 located at a remote location. In the exemplary embodiment, workstations 154 and 156 are personal computers having a web browser. Also, workstations 154 and 156 are configured to communicate with server system 112. Furthermore, fax server 128 communicates with remotely located client systems, including client system 114 using a telephone link. Fax server 128 is configured to communicate with other workstations 138, 140, and 142 as well.

As used herein, the terms "software" and "firmware" are interchangeable, and include any computer program stored in memory for execution by personal computers, workstations, clients and servers, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 3:
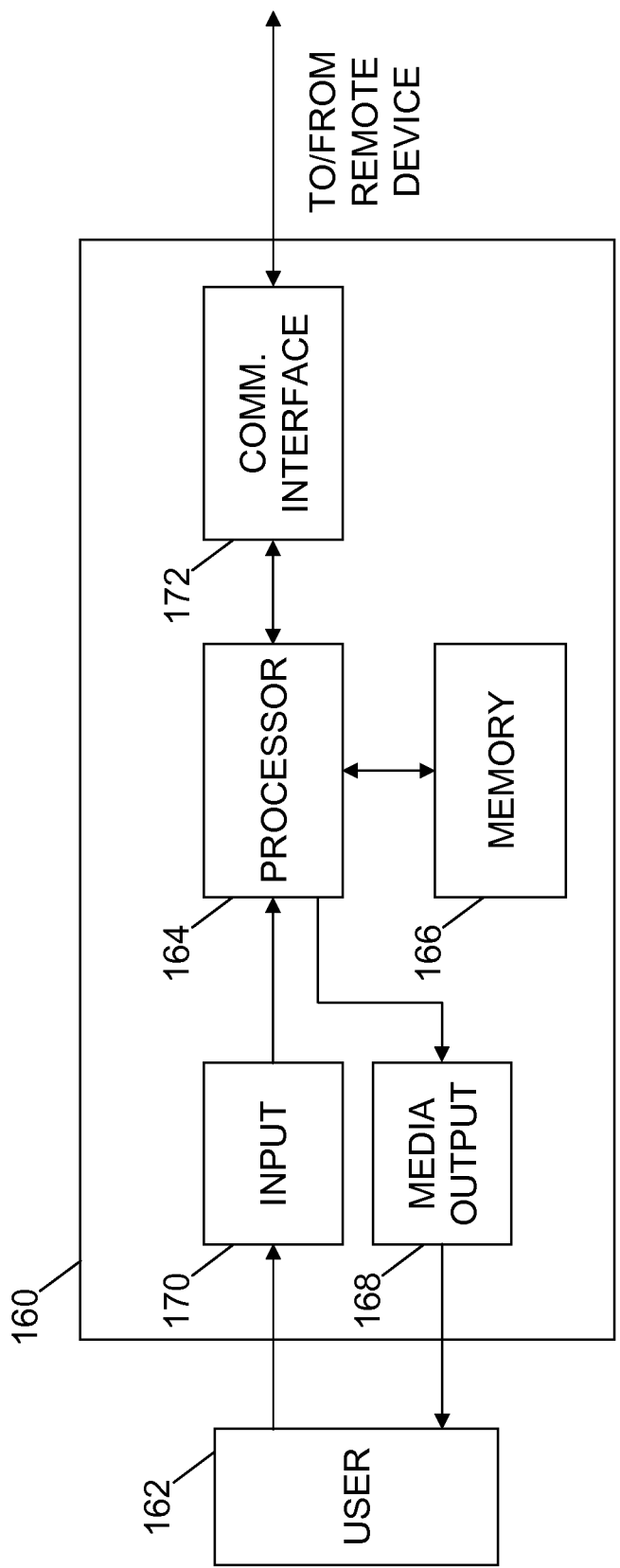
FIG. 3 illustrates an exemplary configuration of a client system shown in FIGS. 1 and 2.

FIG. 3 illustrates an exemplary configuration of a user computing device 160 operated by a user 162. User computing device 160 may include, but is not limited to, client systems 114, 138, 140, and 142, workstation 154, and manager workstation 156 (shown in FIG. 2).

User computing device 160 includes a processor 164 for executing instructions. In some embodiments, a memory area 166, or other computer-readable media, stores executable instructions. Processor 164 may include one or more processing units (e.g., in a multi-core configuration). Memory area 166 is any device allowing information such as executable instructions and/or written works to be stored and retrieved. Memory area 166 may include one or more computer-readable media.

User computing device 160 also includes at least one media output component 168 for presenting information to user 162. Media output component 168 is any component capable of conveying information to user 162. In some embodiments, media output component 168 includes an output adapter such as a video adapter and/or an audio adapter. An output adapter is operatively coupled to processor 164 and operatively couplable to an output device such as a display device (e.g., a liquid crystal display (LCD), organic light emitting diode (OLED) display, or "electronic ink" display) or an audio output device (e.g., a speaker or headphones).

In some embodiments, user computing device 160 includes an input device 170 for receiving input from user 162. Input device 170 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 168 and input device 170.

User computing device 160 may also include a communication interface 172, which is communicatively couplable to a remote device such as server system 112 (shown in FIG. 2). Communication interface 172 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 166 are, for example, computer readable instructions for providing a user interface to user 162 via media output component 168 and, optionally, receiving and processing input from input device 170. A user interface may include, among other possibilities, a web browser and client application. Web browsers enable users, such as user 162, to display and interact with media and other information typically embedded on a web page or a website from server system 112. A client application allows user 162 to interact with a server application from server system 112.

Figure 4:
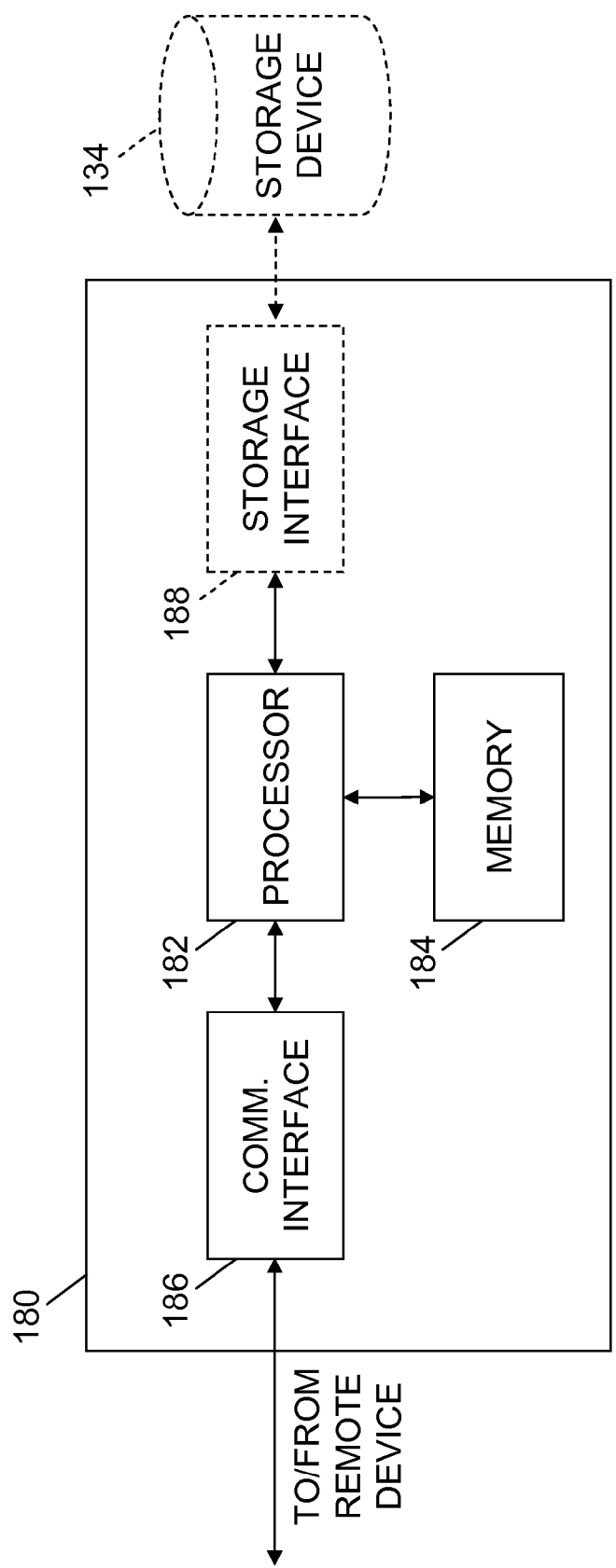
FIG. 4 illustrates an exemplary configuration of a server system shown in FIGS. 1 and 2.

FIG. 4 illustrates an exemplary configuration of a server computing device 180 such as server system 112 (shown in FIG. 2). Server computing device 180 may include, but is not limited to, database server 116, application server 124, web server 126, fax server 128, directory server 130, and mail server 132.

Server computing device 180 also includes a processor 182 for executing instructions. Instructions may be stored, for example, in a memory area 184 or other computer-readable media. Processor 182 may include one or more processing units (e.g., in a multi-core configuration).

Processor 182 is operatively coupled to a communication interface 186 such that server computing device 180 is capable of communicating with a remote device such as user computing device 160 (shown in FIG. 3) or another server computing device 180. For example, communication interface 186 may receive requests from client system 114 via the Internet, as illustrated in FIG. 2.

Processor 182 may also be operatively coupled to storage device 134. Storage device 134 is any computer-operated hardware suitable for storing and/or retrieving data. In some embodiments, storage device 134 is integrated in server computing device 180. For example, server computing device 180 may include one or more hard disk drives as storage device 134. In other embodiments, storage device 134 is external to server computing device 180 and may be accessed by a plurality of server computing devices 180. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 182 is operatively coupled to storage device 134 via a storage interface 188. Storage interface 188 is any component capable of providing processor 182 with access to storage device 134. Storage interface 188 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 182 with access to storage device 134.

Figure 5:
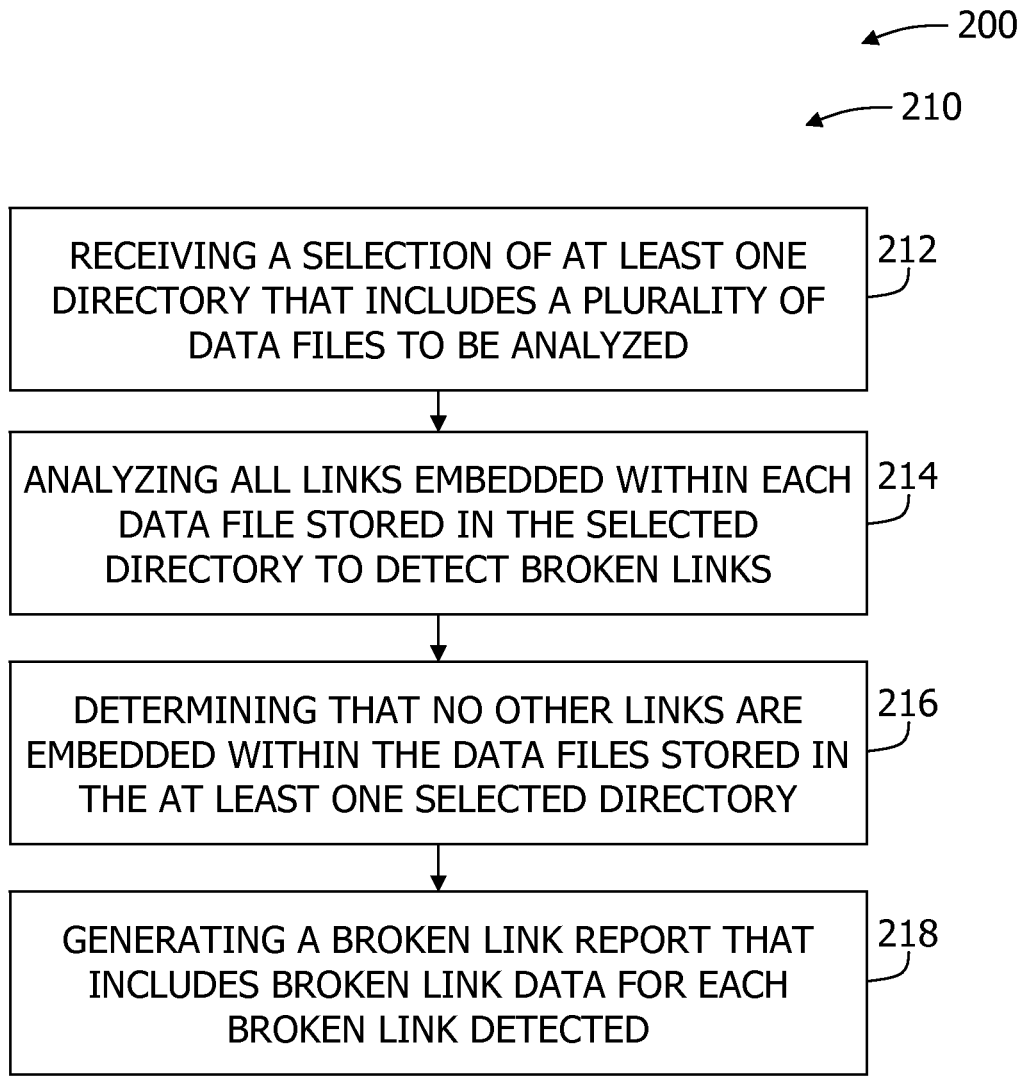
FIG. 5 is a flow chart illustrating an exemplary method implemented using the computer system shown in FIG. 1 for analyzing links included within data files located in a selected directory.

FIG. 5 is a flow chart 200 of an exemplary method 210 for detecting broken links using system 100 (shown in FIG. 1). More specifically, flow chart 200 illustrates an exemplary method 210 for determining a validity of all links included within source files stored in a selected directory. In an exemplary embodiment, method 210 is a computer-implemented method, for example, a computer-implemented method executed by workstation 154 (shown in FIG. 2). In another exemplary embodiment, a computer program embodied on a computer readable medium includes at least one code segment, that when executed by a computer, for example, workstation 154, performs method 210.

As described above, storage device 134 (shown in FIG. 2) of system 122 (shown in FIG. 2) stores electronic files, for example, electronic documents, web pages, image files, sound files, and video files. The electronic files stored in storage device 134 may be organized using a system of directories, also referred to as a file system. The file system is organized as a hierarchy. The hierarchy includes a root directory, sub-directories, and files. The hierarchy of directories may also be referred to using the terms parent directory and child directory. For example, a sub-directory stored within a directory may also be referred to as a child directory relative to a parent directory. Typically, the hierarchy includes the root directory, a plurality of sub-directories stored within the root directory, and a plurality of files stored directly within the root directory and/or within the sub-directories. The root directory is the top-most directory level in the hierarchy. Stored within the root directory is a first level of sub-directories. A second level of sub-directories may be stored within the first level of sub-directories. As referred to herein, the first level of sub-directories and the second level of sub-directories are stored within the root directory. Individual electronic files may be stored in any level of directories. Although described as including three levels of directories, the system of directories may include any suitable number directory levels that allow system 122 to function as described herein. Furthermore, to facilitate navigation between the plurality of files, the files include linking addresses embedded therein. Each valid linking address connects a source file to an active target file. A linking address associated with an invalid (e.g., missing, moved, or renamed) target file is referred to herein as a broken link.

In the exemplary embodiment, method 210 includes receiving 212 at least one control parameter from a user. For example, method 210 may include receiving 212 a selection of at least one directory that includes a plurality of data files to be analyzed. Employee 146 (shown in FIG. 2) may request execution of method 210 using workstation 154 (shown in FIG. 2). Workstation 154 receives 212 the selection of at least one directory to be analyzed. The selected directory is referred to herein as the root directory. In an exemplary embodiment, the user is provided a user interface by workstation 154, and using the user interface, the user is able to input their selection of the directory to be searched for broken links. The data files to be analyzed are either sub-directories or source files. As described above, for navigation between files, the source files include links embedded therein. In the exemplary embodiment, control parameters may also include, without limitation, directories that are to be excluded from analysis, file types that are to be analyzed, and any other control parameters that allow system 100 to function as described herein.

In the exemplary embodiment, method 210 includes analyzing 214 all links embedded within each data file stored in the selected directory to detect broken links. Method 210 also includes determining 216 that no other links are embedded within the data files stored in the at least one selected directory. In the exemplary embodiment, method 210 also includes generating 218 a broken link report that includes broken link data for each broken link detected. In the exemplary embodiment, an XML report is generated 218 through the use of XSLT technology. The broken link data may include, but is not limited to, a file name of the source file that includes the broken link, the address of the invalid target file, and a number of broken links associated with each invalid target file.

Figure 6:
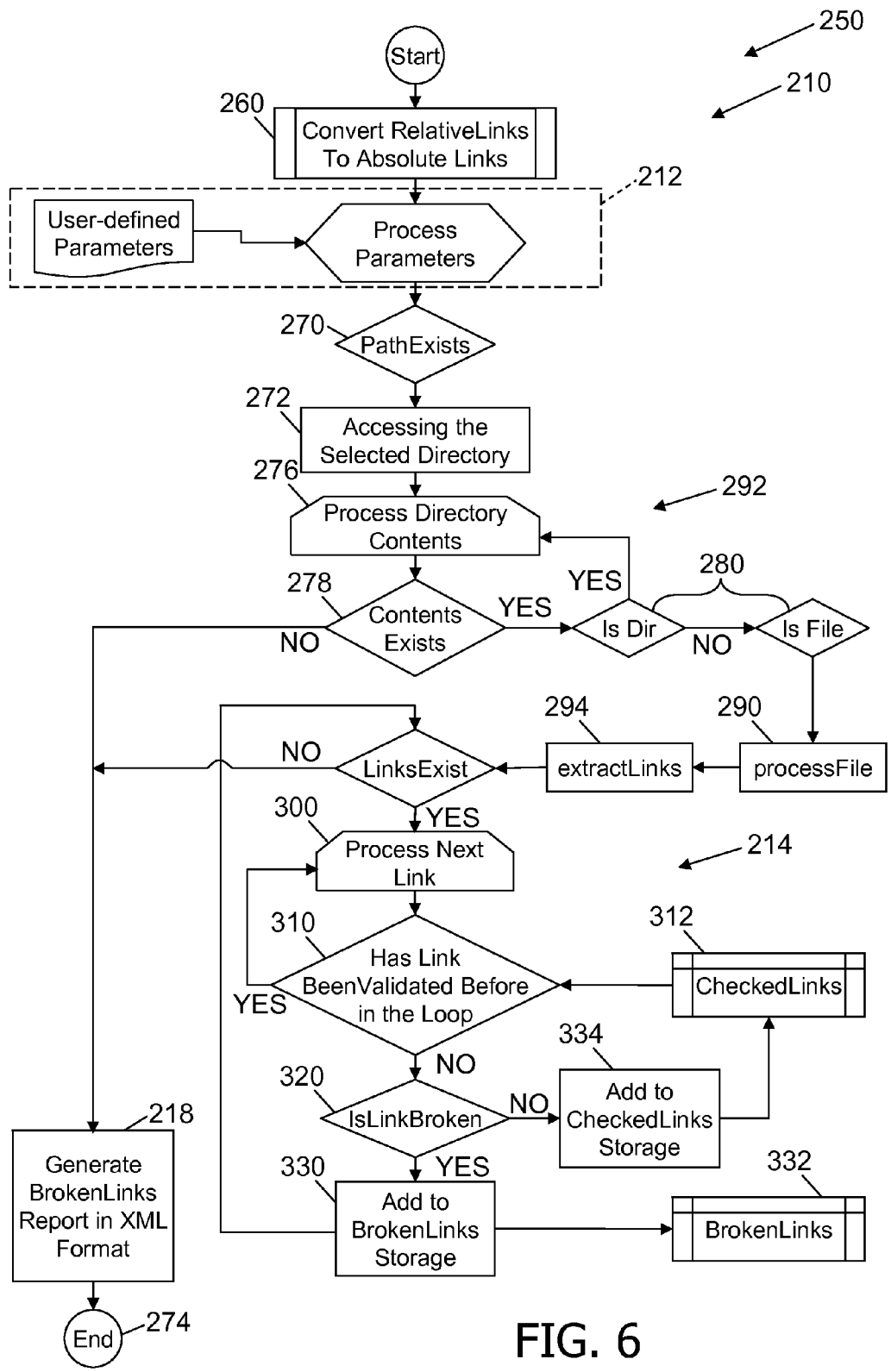
FIG. 6 is a detailed flow chart that further illustrates the steps of the method shown in FIG. 5.

FIG. 6 is a detailed flow chart 250 that further illustrates the steps of method 210. In the exemplary embodiment, method 210 also includes converting 260 the links within a pre-set directory from relative links to absolute links. A link is an absolute link if the URL and/or the file name specifies the exact location of a target file on the network. In contrast, a relative link points to a target file in relation to the source file. Absolute links allow for the link analysis described below. Method 210 may also include determining whether each of the links is a relative link or an absolute link and then converting 260 the relative links to absolute links. In the exemplary embodiment, the pre-set directory is pre-set by a network administrator and includes a directory that includes all files included within a corporate web site. In an alternative embodiment, method 210 includes only converting the links within the at least one selected directory from relative links to absolute links.

As described above, method 210 includes receiving 212 a selection of at least one user-defined control parameter, such as a directory to be analyzed and analyzing 214 all links embedded within each data file stored in the selected directory to detect broken links. A selection of directories to be excluded from the analysis and/or a selection of types of source files to analyze may also be received 212 via a user input. Method 210 may include determining 270 whether a file path exists to the selected directory. If the file path does not exist, method 210 ends 274. For example, a list of directories may be presented to the user. If the list of directories has not been recently updated, the list may include directories that no longer exist on storage device 134 (shown in FIG. 2). Since the selected directory is no longer stored on storage device 134, scanning for broken links would not be beneficial.

Method 210 includes accessing 272 the selected directory if workstation 154 (shown in FIG. 2) determines 270 that the selected directory exists. By accessing 272 the selected directory, the selected directory becomes an active directory (i.e., the currently open directory). Method 210 also includes processing 276 a next available data file which includes determining 278 whether the active directory contains any data files.

In the exemplary embodiment, method 210 includes determining 280 whether a first data file in the active directory is a source file or a sub-directory. If the data file is a sub-directory, the sub-directory is accessed 272 (i.e., the sub-directory is opened and becomes the active directory). If the first data file in the active directory is a source file, the source file is processed 290 as described below. Method 210 includes navigating 292 through the hierarchy of directories includes traversing through the directory tree to identify the source files stored therein. For example, if it is determined 278 that the active directory is empty or that all data files in the active directory have been processed, it may be determined whether the active directory is a root directory. If the active directory is not the root directory, by definition, the active directory is stored within a parent directory. Navigating 292 includes changing between directories until all data files within the selected directory have been processed 276 to identify source files, and all source files within the selected directory have also been processed 290 to identify links.

In the exemplary embodiment, method 210 includes processing 290 the source file and extracting 294 links from the source file. Processing 290 includes opening the source file and parsing the source file to identify links embedded within the source file. The links are extracted 294 in preparation for analysis 214 of the links, which is described further below. In the exemplary embodiment, all data files in the selected directory are processed 276 to identify source files therein. The source files are processed 290 to identify and extract 294 links embedded therein.

In the exemplary embodiment, analyzing 214 the links includes processing 300 a first of the extracted links. Analyzing 214 may also include determining 310 if the functionality of the link being processed 300 has previously been validated. For example, the link may be compared to a compiled or stored database 312 of previously validated links. If the link has previously been validated, method 210 processes 300 the next link. If the link has not previously been validated, the validity of the link is determined.

For example, determining 320 the validity of a link may include reading the link and appending a hostname parameter to the link to generate a link validity request. For example, the hostname parameter (e.g., the host name of the webserver that has provided the source file) may be appended to the link to generate a dummy read HTTP (Hypertext Transfer Protocol) request. The link validity request is sent to, for example, server system 112 (shown in FIG. 2). If a valid response is received in response to the link validity request, the link is determined to be valid. If a valid response is not received, the link is determined to be broken.

Method 210 includes adding 330, to a broken link report 332, broken link data for each broken link identified. Broken link data may include, but is not limited to, the source file URL, the target file URL, the linking address, and/or a number of times the broken link was identified. Method 210 may also include storing 334 data associated with the validated links, for example, in database 312.

Once the extracted links have been analyzed 214, a final broken link report is generated 218 from the broken link report 332. For example, method 210 may include generating 218 an XML (extended markup language) report document that includes the broken link data for each broken link detected.

Described herein are exemplary systems and methods for detecting broken links between source files and target files. More specifically, the systems and methods described herein enable a user to analyze all links included within data files located in a selected directory. By allowing the user to select the directory, and to limit the analysis to the data files stored within that directory, the systems and methods described herein ensure the links within those data files are valid without crawling into data files the user has no interest in examining Furthermore, by limiting the analysis to the selected directory, the speed of the analysis is reduced when compared to web crawling applications.

The systems and methods described herein facilitate efficient and economical analysis of the validity of links embedded within data files stored in a selected directory. Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for detecting broken links using a computer coupled to a database, a plurality of links including valid links and broken links are embedded within data files stored in the database, said method comprising:
   receiving, at the computer, a selection of at least one directory that includes a plurality of data files to be analyzed and a selection of a directory to be excluded from analysis, wherein the excluded directory includes one or more data files;
   determining whether each of the links included within the at least one selected directory is a relative link or an absolute link;
   converting the relative links to absolute links;
   analyzing all links embedded within the data files stored in the at least one selected directory to detect broken links;
   determining that no other links are embedded within the data files stored in the at least one selected directory; and
   generating a broken link report that includes broken link data for each broken link detected.

2. A method in accordance with claim 1, wherein analyzing all links embedded within the data files stored in the at least one selected directory comprises processing only the data files within the at least one selected directory to detect broken links.

3. A method in accordance with claim 1 further comprising receiving, at the computer, a selection of at least one file type to be analyzed.

4. A method in accordance with claim 1 further comprising processing a first data file stored within the at least one selected directory, the first data file including at least one of a sub-directory and a source file.

5. A method in accordance with claim 4, wherein processing the first data file stored within the at least one selected directory comprises:
   identifying the first data file as a first source file, the first source file comprising a first linking address that links the first source file to a target file;
   accessing the first source file; and
   extracting the first linking address from the first source file.

6. A method in accordance with claim 5, wherein processing the first data file stored within the at least one selected directory further comprises:
   sending a first validity request to the first linking address;
   receiving a first response indicating that the first linking address is valid; and
   storing the first linking address in the broken link report if no response is received.

7. A method in accordance with claim 6, wherein receiving the first response comprises receiving a response indicating that the target file is active.

8. A method in accordance with claim 4, wherein processing the first data file stored within the at least one selected directory comprises:
   identifying the first data file as a sub-directory;
   opening the sub-directory;
   processing a first data file stored within the sub-directory; and
   returning to the at least one selected directory if the sub-directory is empty.

9. A method in accordance with claim 1, wherein analyzing all links further comprises analyzing all absolute links included within the data files, wherein all absolute links include any absolute links originally embedded in the data files, and any relative links converted into absolute links originally in the data files that were converted to absolute links.

10. A computer program embodied on a non-transitory computer readable medium for detecting broken links embedded within a plurality of data files stored in at least one selected directory, said program comprises at least one code segment executable by a computer to instruct the computer to:
receive, from a user, a selection of at least one directory that includes a plurality of data files to be processed and a selection of a directory to be excluded from processing, wherein the excluded directory includes one or more data files;
process the plurality of data files to identify links embedded within the data files;
determine whether each of the links included within the plurality of data files stored in the at least one selected directory is a relative link or an absolute link;
convert the relative links to absolute links;
process the links to detect broken links;
determine that no other links are embedded within the plurality of data files; and
generate a broken link report that includes broken link data for each broken link detected.

11. A computer program embodied on a non-transitory computer readable medium in accordance with claim 10, wherein the plurality of data files include at least one of a sub-directory and a source file, the source file including links embedded therein for navigating between the source file and at least one target file.

12. A computer program embodied on a non-transitory computer readable medium in accordance with claim 10 further comprising at least one code segment executable by a computer to instruct the computer to navigate through the plurality of data files stored within the at least one selected directory to identify links embedded therein.

13. A computer program embodied on a non-transitory computer readable medium in accordance with claim 10 further comprising at least one code segment executable by a computer to instruct the computer to process a first data file stored within a first directory of the at least one selected directory.

14. A computer program embodied on a non-transitory computer readable medium in accordance with claim 13 further comprising at least one code segment executable by a computer to instruct the computer to:
identify the first data file as a first source file;
access the first source file, the first source file comprising a first linking address that links the first source file to a target file; and
extract the first linking address from the first source file.

15. A computer program embodied on a non-transitory computer readable medium in accordance with claim 14 further comprising at least one code segment executable by a computer to instruct the computer to:
send a first validity request to the first linking address;
receive a first response from the first target file indicating that the first linking address is valid, wherein a valid linking address corresponds to an active target file; and
store the first linking address in a broken link report if no response is received.

16. A computer program embodied on a non-transitory computer readable medium in accordance with claim 13 further comprising at least one code segment executable by a computer to instruct the computer to:
identify the first data file as a sub-directory;
open the sub-directory;
process a first data file stored within the sub-directory; and
return to the first directory if the sub-directory is empty.

17. A computer program embodied on a non-transitory computer readable medium in accordance with claim 13 further comprising at least one code segment executable by a computer to instruct the computer to access a second directory of the at least one selected directory when all data files within the first directory have been processed.

18. A computer program embodied on a non-transitory computer readable medium in accordance with claim 10 further comprising at least one code segment executable by a computer to instruct the computer to access a second source file stored within the first directory, the second source file comprising a first linking address that links the second source file to a target file.

19. A computer for detecting broken links embedded within data files stored in a database coupled thereto, said computer configured to:
receive a selection of at least one directory stored in the database, the at least one directory including a plurality of data files to be analyzed;
receive a selection of a directory to be excluded from analysis, the excluded directory including one or more data files;
determine whether each of the links included within the plurality of data files to be analyzed is a relative link or an absolute link;
convert the relative links to absolute links;
analyze all links embedded within the data files stored in the at least one selected directory to detect broken links;
determine that no other links are embedded within the data files stored in the at least one selected directory; and
generate a broken link report that includes broken link data for each broken link detected.

20. A computer in accordance with claim 19 wherein the computer is further configured to process a first data file stored within a first directory of the at least one selected directory.

21. A computer in accordance with claim 20 wherein the computer is further configured to:
identify the first data file as a first source file;
access the first source file, the first source file comprising a first linking address that links the first source file to a target file; and
extract the first linking address from the first source file.

22. A computer in accordance with claim 21 wherein the computer is further configured to:
send a first validity request to the first linking address;
receive a first response from the first target file indicating that the first linking address is valid, wherein a valid linking address corresponds to an active target file; and
store the first linking address in a broken link report if no response is received.

23. A computer in accordance with claim 20 wherein the computer is further configured to:
identify the first data file as a sub-directory;
open the sub-directory;
process a first data file stored within the sub-directory; and
return to the first directory if the sub-directory is empty.

* * * * *